United States Patent [19]

Jundt et al.

[11] Patent Number: 4,562,389
[45] Date of Patent: Dec. 31, 1985

[54] AUTOMATIC SCREWDRIVER OR TORQUING TOOL CONTROL SYSTEM

[75] Inventors: Wolfgang Jundt, Ditzingen; Günter Schaal, Stuttgart; Fritz Schädlich, Leinfelden-Echterdingen; Hans-Joachim Vogt, Stuttgart; Steffen Wünsch, Dettenhausen, all of Fed. Rep. of Germany

[73] Assignee: Robert Bosch GmbH, Stuttgart, Fed. Rep. of Germany

[21] Appl. No.: 536,194

[22] Filed: Sep. 27, 1983

[30] Foreign Application Priority Data

Sep. 29, 1982 [DE] Fed. Rep. of Germany ....... 3236033

[51] Int. Cl.$^4$ .............................................. H02P 7/00
[52] U.S. Cl. .................................. 318/432; 318/314; 318/566; 318/635; 81/10; 81/469
[58] Field of Search ............... 81/10, 469; 318/4, 314, 318/729, 278, 432, 566, 634, 635, 650, 809, 438, 508, 374, 689, 434, 729; 323/285, 217

[56] References Cited

U.S. PATENT DOCUMENTS

| | | | |
|---|---|---|---|
| 3,142,800 | 7/1964 | Miller | 318/432 X |
| 3,477,007 | 11/1969 | Ducommun et al. | 318/434 |
| 3,527,991 | 9/1970 | Sackin | 318/634 |
| 3,892,146 | 7/1975 | Yososhima | 81/469 |
| 4,056,762 | 11/1977 | Schadlich | 318/434 X |
| 4,066,942 | 1/1978 | Bardwell et al. | 318/434 |
| 4,379,986 | 4/1983 | Baxter et al. | 318/434 |
| 4,384,243 | 5/1983 | Muskovac | 318/729 |
| 4,387,329 | 6/1983 | Harlow | 318/809 |

FOREIGN PATENT DOCUMENTS 2600939 7/1977 Fed. Rep. of Germany ........ 81/469
56-35032 4/1981 Japan ................................... 318/434

Primary Examiner—William M. Shoop, Jr.
Assistant Examiner—Bentsu Ro
Attorney, Agent, or Firm—Frishauf, Holtz, Goodman & Woodward

[57] ABSTRACT

To permit reliable turn-OFF of the motor when the torque of the motor is sufficient to provide for reliable seating of a screw or nut being driven thereby, start conditions of the motor are sensed, either in form of low-current condition or high power factor; high-torque conditions are sensed by low power factor, or high-current, in dependence on the desired torque level which results, respectively, in a comparatively steep phase angle-torque or current level-torque curve. A switch control is energized to turn-OFF the motor current if the phase angles, or the motor current, respectively, are beyond predetermined levels. To prevent in-rush current, or high power factors from affecting the operation of the turn-OFF system, timing circuits are provided to disable the turn-OFF system when the motor is first turned-ON or if the phase angle difference, as determined by time-comparator networks, between current and voltage, is below a predetermined value. Timing duration of at least one of the timing circuits can be controlled as a function of motor temperature to provide for linear response of the system, regardless of changes of motor operating parameter versus torque characteristics under varying motor temperature conditions.

13 Claims, 4 Drawing Figures

AUTOMATIC SCREWDRIVER OR TORQUING TOOL CONTROL SYSTEM

The present invention relates to electric tools and more particularly to automatic tools which provide a certain torque to an element forming a screw connection, such as a screw, a nut, bolt, or the like, in which the tool is turned OFF when the respective element is tightly seated.

BACKGROUND

It has previously been proposed to sense the torque applied by electric screwdrivers and the like, hereinafter for short "electric tool" by measuring the motor current and utilizing the measured current as representative of torque being applied to a screw, nut, or the like (see German Patent Disclosure Document DE-OS No. 15 88 032). A shunt is placed in the motor current circuit, and voltage dropped across the shunt is sensed and applied to an electric control circuit. When the motor current reaches a certain value, resulting in a predetermined voltage drop across the shunt, a response circuit measures the voltage and controls the power circuit to the motor to interrupt current flow thereto. This system, while simple, has a disadvantage: if the motor is subjected to a substantial in-rush current pulse, the voltage across the shunt may be such that the turn-off circuit responds so that the tool can never be started. An additional disadvantage arises in some tools, particularly those in which the drive motor is subject to variations in characteristics due to tolerances in manufacture, or, for example, upon repair. Any change in the motor from a standard performance characteristic requires comparatively complex adjustment, since the relationship between motor current and torque may not be linear, and may not be consistent in many motors made under mass-production conditions. Readjustment of control circuitry or control elements, under mass-production conditions, is expensive and, preferably, to be avoided.

Various circuits have been proposed which include timers and which disconnect motor current after a predetermined operating time, corresponding, based on experience, to fastening a screwed element under predetermined conditions. Such circuits will not, however, provide uniform tightening torque to the screwed elements since the starting torque conditions of most screwed elements are not defined and thus the time required to secure screwed elements, with uniform torque, may vary.

THE INVENTION

It is an object to provide a circuit arrangement which permits tightening of screwed elements to predetermined torque, in which the rush-in current pulse will not cause undesired turn-off of the power circuit, and in which the torque actually applied by the motor is controlled to be uniform, regardless of tolerance variations of the motor operating characteristics.

Briefly, the start conditions are sensed, coupled to a current sensing element, typically a resistor in series with the main motor circuit; high-torque conditions likewise are sensed, the high-torque current conditions being representative of seating of a screw, nut, or the like—hereinafter "screw"—being driven by the drive motor of the tool. A switch control means is connected to and controls the motor switch to turn the motor OFF only when the high-torque conditions are sensed.

In accordance with a feature of the invention, turn-ON of the motor current is determined by sensing voltage across a series dropping resistor and, upon first sensing such voltage, an over-current or high-current cutout is disabled for a predetermined time interval, thus eliminating spurious disconnection of the motor power supply due to in-rush current pulses. High-torque conditions then can be sensed by measuring motor current. In accordance with another feature of the invention, rather than measuring the level of motor current, the phase relationship between motor current and supply voltage is sensed and when the phase relationship changes beyond a predetermined phase difference, the motor is turned OFF, the phase difference indicating that the motor is highly loaded and, hence, voltage and current supplied to the motor are substantially out-of-phase.

The system has the advantage that the in-rush current pulse will not cause turn-off of the motor; in accordance with a feature of the invention, determination of the phase angle between voltage and current permits control of the motor of the tool independent of power output, and representative of torque. If the phase angle, causing turn-off is once set, the motor or components thereof may be exchanged since the phase relationships resulting in certain torques of motors of any one type are essentially independent of the specific construction of the motor, or tolerances in its manufacture. Elimination of the in-rush current pulse from motor control at the high-torque condition eliminates erroneous switching of motor current.

In accordance with a preferred feature of the invention, voltage and current signals are applied to respective threshold switches, and the signals are compared in an AND-gate, which controls disconnection of power current to the motor if the output signal of the AND-gate exceeds a predetermined duration, for example as sensed by a timing circuit. Another timing circuit can be included in the threshold circuit which measures voltage. This permits basic setting of the phase shift between current and voltage to obtain reproducible turn-off characteristics. The phase shift can be also determined by using a timing circuit which compares the respective timing of the current and voltage pulses. Temperature changes, and temperature influences acting on the switching instant of the timing circuit can be eliminated or the temperature-timing variation can be made dependent on the temperature of the tool itself.

Power tool control circuits frequently use triacs. A third timing circuit, which maintains the TURN-OFF pulse for a period of time sufficiently long to permit the supply voltage to reliably pass through zero or null, maybe used in the control circuit for the triac, so that the triac will turn OFF only when the voltage goes to zero or null, insuring reliable switching even if the TURN-OFF pulse occurs in the interval between two undulations of the voltage wave passing through zero or null.

The control system can be made in a particularly simple and reliable manner if a timing circuit is included therein which activates the control circuit only after a predetermined minimum time has elapsed subsequent to energization of the motor. This prevents erroneous switching due to measurements derived based on in-rush current, or in-rush current pulses. The initial connection pulse, thus, will no longer cause immediate disconnection of the system. The arrangement can be easily implemented by use of two comparators, one switching at an upper threshold level and the other at a lower threshold level. The control system then will be particularly simple and reliable.

If comparators are used for upper and lower threshold level of current flow, use of a timing circuit connected to the lower threshold level comparator is desirable since the timing circuit is readily capable of suppressing in-rush current pulses in a simple and effective manner. A memory element can be provided which is SET when a predetermined current is exceeded, thus preventing automatic reconnection of the tool after the current has dropped, unless the memory element is specifically RESET.

DRAWINGS

DETAILED DESCRIPTION

Figure 1:
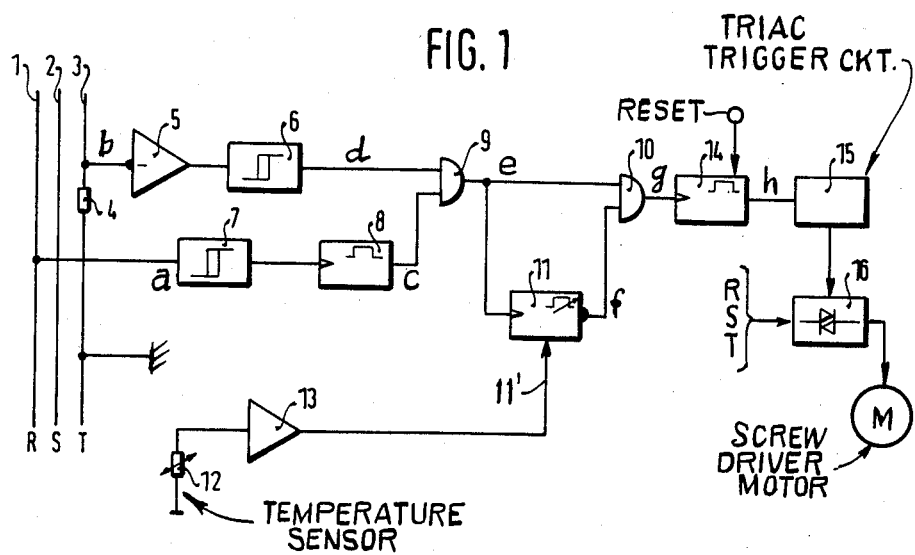
FIG. 1 is a general circuit diagram of one embodiment of the system in accordance with the invention.

Three supply lines 1,2,3 form power supply connections for an electric screwdriver motor M, the speed, direction of rotation, and the like of which is controlled by a thyristor network 16, shown only schematically. The main ON/OFF switch can be connected as is customary, and is not shown. The control circuit for the thyristor trigger voltage, likewise, has not been shown and can be of any suitable and standard construction.

A resistor 4 is included in one of the lines 1,2,3 as shown in line 3. The voltage drop across resistor 4 is sensed by an amplifier 5 which, inherently, includes an invertor. The amplifier/invertor 5 is connected to a comparator 6. The comparator 6 provides a switching signal each time when the output voltage of the amplifier 5 passes through zero or null. The output of the comparator 6 is connected to one input of an AND-gate 9.

The line 1 of the power supply is connected to the input of a comparator 7, the output of which is connected to the dynamic input of a monostable multivibrator (MMV) 8. The output of MMV 8 is connected to the second input of the AND-gate 9. The connection line 3 is the ground, or chassis connection for the electronic circuit. The output of the AND-gate 9 is connected to the input of an AND-gate 10 and further to the dynamic input of a second MMV 11. The output of the MMV 11 is connected to a second input of the AND-gate 10. The timing of the second MMV 11 is variable, and controlled at a timing control input 11'; the variable timing of MMV 11 is shown by the arrow through the pulse symbol within the timing pulse diagram of the MMV 11. A temperature sensor 12 is provided, located, for example, on the housing or otherwise in temperature sensing relation with the tool, or the motor 16. The output of temperature sensor 12 is connected through an amplifier 13 to the timing control input 11' of the MMV 11. The output of the amplifier 13, thus, controls the switching or unstable time of the MMV 11. The output of AND-gate 10 is connected to the dynamic input of an MMV 14, the output of which is connected to a triac trigger circuit 15. The triac trigger circuit switches a group of triacs which are connected to the respective supply lines R,S and T. The triac in line T could be omitted. The motor M of the screwdriver is connected to the output of the respective triacs.

Figure 2:
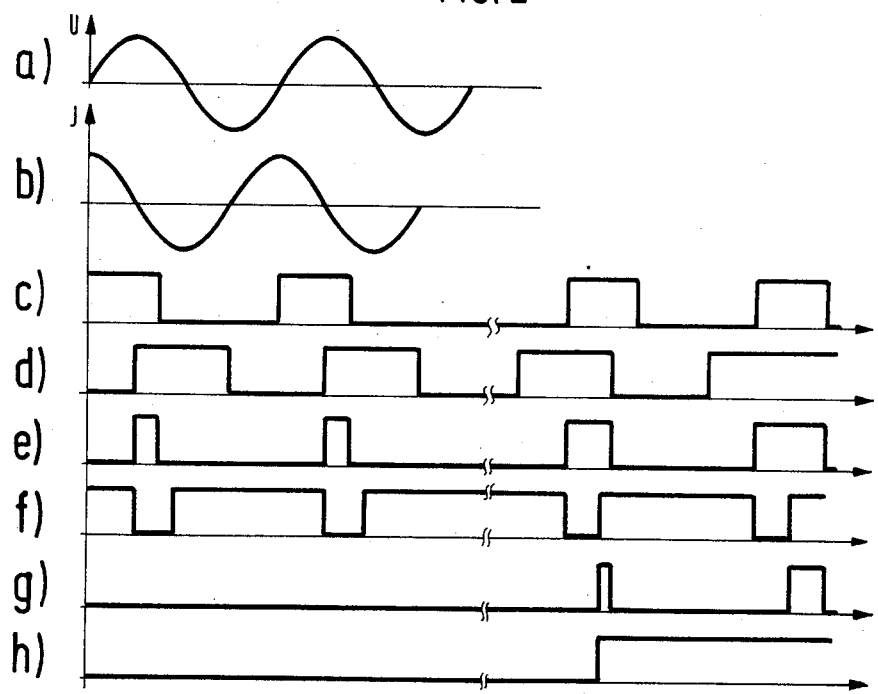
FIG. 2 is a wave diagram illustrating the operation of the system of FIG. 1.

Operation, with reference to FIG. 2:

The control system uses the characteristics of motors which are heavily loaded that the function cos $\phi$, that is, the power factor between current and voltage, changes as the motor M is loaded. Using the power factor, that is, the phase angle, or rather the function cos $\phi$, as the measuring value has the advantage that the relationship of cos $\phi$ is approximately the same, regardless of the size of the motor. The value of cos $\phi$ varies between about 0.4 to 0.9. The phase angle increases rather rapidly with increasing load and reaches a limiting, or a saturation value, when a certain load is placed on the motor. Thus, the change in phase angle cos $\phi$ can be easily used as a measuring value to obtain precise disconnection or turn-OFF of the motor M at a predetermined torque.

The respective graphs a to h of FIG. 2 show the signals at points in FIG. 1 which have been given the same letter designation as the graphs. FIG. 2, graph a, shows a voltage which can be tapped off line 1, and graph b illustrates the curve of the current drawn by the motor. The current causes a voltage drop across resistor 4, which is available as an input signal to the input amplifier 5. The pulses derived from the output of the second MMV 8 are shown in graph c. Each time when comparator 7 passes through null or zero, a signal is generated, the rising flank of which triggers the MMV 8 which, after a predetermined period of time will reset to the initial state. Other timing elements, such as counters and the like, may be used to time the interval, here timed by the MMV. The length of the pulses at the output of a MMV is always the same, as is clearly apparent in the graph c of FIG. 2. By suitable choice of the switching period or timing duration of the MMV 8, it is thus possible to provide a base setting for the control system so that, by then adjusting the MMV 11, a fine control of the control system, combined if desired with temperature compensation, for example based on motor temperature, is possible.

Graph b, as seen in FIG. 2, is the current signal which is amplified by amplifier 5 and, inverted, is applied to comparator 6. Comparator 6 will be turned ON, when the output of the amplifier 5 has a positive half-wave, and provide an output signal shown in graph d of FIG. 2. Inversion of the signal is obtained, as above referred to, by the inverting characteristics of the amplifier 5, schematically shown by the dot input thereto. The output of the AND-gate 9 will have the signal of graph e of FIG. 2, which is a conjunctive combination of the input signals thereto, proportional to current and voltage. The output signal of the AND-gate 9 thus will be representative of phase shift between current and voltage. Graph e clearly shows that the left side has relatively short pulses. As the torque increases, and the phase shift increases, the right side of the graph will cause longer pulses to occur; the right side, thus, shows the condition at which the screw-in, or screw-tightening process is terminated.

The rising flank of the output signal of the AND-gate 9 triggers the MMV 11, which will have an output signal as shown in graph f of FIG. 2. If the phase angle between voltage and current did not reach a predetermined value, that is, if the loading on the motor M is low, the output pulse of the AND-gate 9 will be less than the pulse of the MMV 11—graph f. The output of the AND-gate 10—as seen in graph g, thus will be a 0-signal. As the phase angle increases, the output signal of the AND-gate 9 will become longer; at the predetermined instant, the output signal of the AND-gate 9 will be so large that its duration will be longer than the signal derived from the MMV 11, and the output of the AND-gate 10 will provide the pulse shown at the right side of graph g. The MMV 14 will be SET by the pulses of graph g, providing an output as shown in the graph h. The output signals h from the MMV 14 cause the triac trigger circuit 15 to block, so that no further pulses will be applied to the triac 16.

The output signal of the MMV 14 must extend for a period sufficiently long to provide for reliable turn-OFF of the triac 16, and, preferably, is applied at least for one halfwave of the power supply frequency, e.g., at least for 1/120 seconds for a 60 Hz network. Comparator 6, once triggered will not revert to zero, however, as shown at the extreme right side of graph d of FIG. 2. The output of the AND-gate 10 will continue to provide pulses as seen in graphs e and g, thus providing, continuously, new switching pulses to the MMV 14 retaining the motor M of the tool in OFF condition.

A reset terminal on the MMV can be provided for manual override, a reset the MMV 14, which permits renewed operation of the motor. This reset circuit can be connected, for example, to a main switch.

The temperature sensor 12 is located in thermal sensing relationship with the motor M, or another component of the tool. This permits compensation of temperature-dependent influences on the tool by changing the timing period of the timing element 11.

Asynchronous motors will become hot during operation, particularly if the motors are loaded to their maximum torque. Such heating can change the relationship between phase angle of current and voltage and torque. By measuring the temperature of the motor, and affecting as redundant the timing interval of the timing circuit 11 in such a way that the temperature changes of the motor are compensated, it is possible to make the entire system essentially motor-temperature independent. The pulse length of the timing circuit 11 must be set to increase the timing at the timing input 11′ with increasing temperature; if the temperature drops, the timing interval or pulse length of the timing element 11 must be shortened.

The torque which will be the final applied torque is determined, essentially, by the timing interval of the timing circuit 11, since the turn-OFF point is reached when the time, corresponding to the phase angle function cos $\phi$, corresponds to the phase angle function cos $\phi$ as set by the output signal from the AND-gate 9—graph e on FIG. 2. This permits adjustment of the applied torque in a simple and reliable manner by comparison; the particular motor, and actually the size of the motor becomes irrelevant, and the system can be used with practically any asynchronous motor since the phase angle-torque relationship is essentially independent of motor size.

For some uses, it is desirable to have very high applied torques. As the torque output of the motor increases, the curve of the function cos $\phi$ becomes flat and it is difficult to obtain a reliable, reproducible turn-OFF characteristic at high-torque ranges merely based on current/voltage phase shift. For such motors, determination of the turn-OFF point is better by using current as the measuring criterion. At very high torques, the current through the motor rises rapidly, that is, the current-torque curve or relationship is steep, so that a turn-OFF point can be determined with accuracy and reproducibility.

Figure 3:
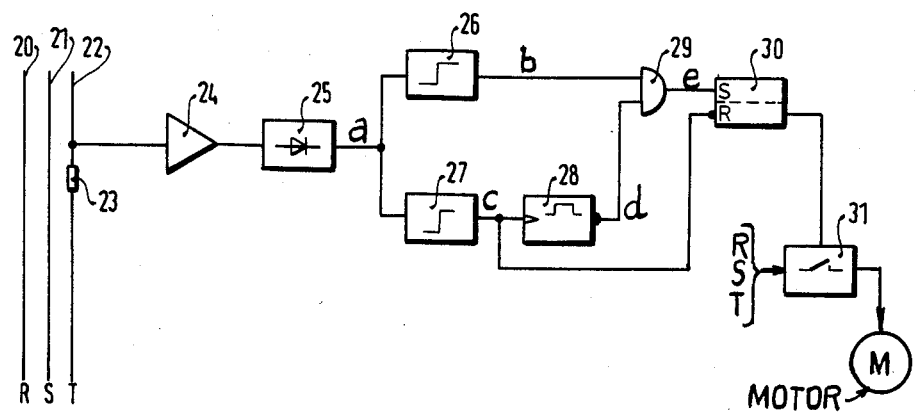
FIG. 3 is a general circuit diagram of another embodiment of the invention.

The embodiment of FIG. 3 illustrates turn-OFF of motors operated under high-torque turn-OFF conditions, in which the level of current forms the turn-OFF characteristics. The respective phases of a supply line 20,21,22 are illustrated; a shunt resistor 23 is included in supply line 22. The motor M is connected to the power supply lines 20,21,22 through a switch 31.

A branch line is connected between the supply line 22 and an amplifier 24, the output of which is rectified in a rectifier 25. The output of threshold switch 25 is connected to a first threshold circuit 26 and a second threshold circuit 27. Threshold switch 26 is set to sense an upper threshold level 33, FIG. 4, while the threshold switch 27 is set to sense a lower threshold switch 34. The output of the threshold 26 is connected to an input of an AND-gate 29; the output of threshold switch 27 is connected to the dynamic input of an MMV 28. The output of the threshold switch 27 is, additionally, connected to an inverting reset input of a storage or memory flipflop (FF) 30. The output of the MMV 28 is connected to a second input of the AND-gate 29. The output of AND-gate 29 is connected to the SET input of the FF 30. The inverted output from the FF 30 is connected as a control output to the main switch 31 which is interposed within the power supply lines 20, 21,22, shown as lines R,S,T. The switch is shown as a mechanical switch but may, of course, be an electronic switch such as a thyristor circuit (see FIG. 1).

Figure 4:
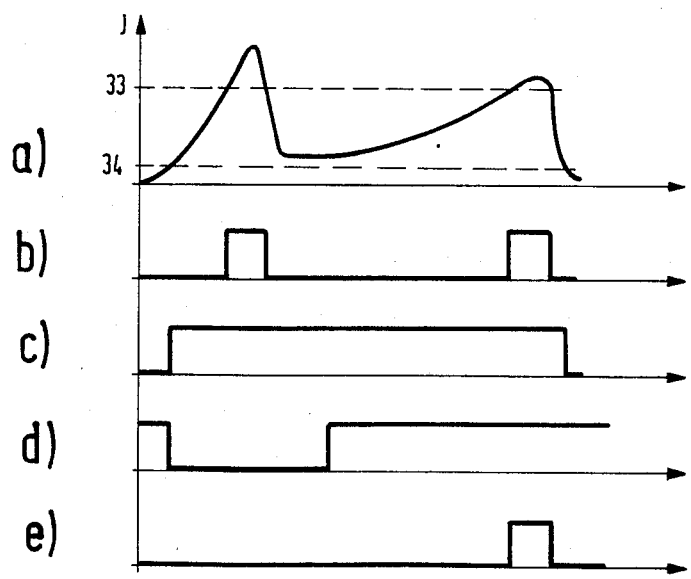
FIG. 4 is a wave diagram to illustrate the operation of the embodiment in accordance with FIG. 3.

Operation, with reference to FIG. 4:

The circuit of FIG. 3 has the advantage that current, as a measuring parameter, has a steep rise which is essentially linear in the range in which the phase angle-torque relationship is represented only by a shallow curve. The current-time relationship of the motor is shown, in a typical nut-tightening or screw-in operation, in graph a of FIG. 4. Upon first connection, an in-rush current pulse, occurring upon starting of the motor, will occur. The current, upon starting of the motor, and initial running thereof, drops. As the screw is inserted, the motor current will rise slowly from a lower level until, when the screw approaches tightness, the current will rise rapidly until it will reach an upper level which is defined by the threshold level 33 of the comparator 26. It is now necessary to disconnect the motor to prevent a blocked-rotor current flow, and destruction of the motor.

The current-time curve, upon tightening of a nut or inserting a screw, is shown in FIG. 4 in which the current relationship, in graph a, is illustrated in form of the voltage available from rectifier 25. The power in lines 20,21, 22 is a-c power. The comparator 26 provides a signal each time when the upper threshold level 33 thereof is exceeded. This signal is shown in graph b of FIG. 4. A first signal is derived from comparator 26 when the motor is first turned ON, a second signal when the appropriate torque has been reached. As can readily be seen, the first impulse, upon first connection of the motor, is an error pulse, due only to the starting in-rush current, and not to tightening of a screw. It is, thus, necessary to eliminate the effect of the first pulse.

Comparator 27 is provided to remove the first pulse from consideration by the switching network. Comparator 27 switches at the lower threshold level 34, that is, as soon as any measurable current flows, and provides a signal as shown in graph c of FIG. 4. The rising flank at the output of comparator 27 causes the MMV 28 to be triggered so that, during a predetermined time interval, the signal d will be obtained which interrupts, or blocks the gate 29. The signal of graph d and the signal b from comparator 26 are conjunctively logically combined in the AND-gate 29. By blocking, or strobing of the first pulse of the comparator 26 by the negative pulse applied from the MMV 28 to the AND-gate 29, output from the AND-gate 29 is blocked—see graph e of FIG. 4. The second rise in current—see graph a—will, however, permit an output signal to be derived from the AND-gate 29. This causes the FF 30 to be SET, and thus interrupting current flow through switch 31 and disconnecting the motor M.

To provide for manual resetting of the motor, a pushbutton or the like may be provided for RESET of FF 30 for renewed energization of the screwdriver motor M; if this is desired, the connection between the output of the threshold switch, or comparator 27, and the RESET input of the FF 30 can be eliminated.

Threshold switch 27, which responds to the low-current threshold 34, will cause triggering of the MMV 28, regardless of whether the first pulse exceeds the upper threshold level 33, or not. The combination of elements 27, 28 thus operates only to suppress the effect of a high pulse-not to count the pulses—as is clearly seen in graph e of FIG. 4.

Various changes and modifications may be made and features described in connection with any one of the embodiments may be used with any of the others, within the scope of the inventive concept.

We claim:

1. An electric automatic nut or screwdriver control system having a drive motor (M);
   electric current supply lines (1, 2, 3; 20, 21, 22);
   controlled switch means (15, 16; 31) connected between the current supply lines and the motor;
   current measuring means (4; 23) serially connected with the motor in one (3, 22) of the supply lines and providing a current signal representative of current flow to the motor;
   and a control network responsive to said current signal and connected to and controlling said controlled switch means,
   comprising, in accordance with the invention,
   starting condition sensing means (FIGS. 1, 2: 6–9; FIGS. 3, 4: 26–29), coupled to said electric current supply lines, for sensing high-torque conditions of the motor which are representative of seating of a screw, being driven by the drive motor, said sensing means comprising
   means (26) for sensing a maximum current and deriving a maximum current signal (b);
   timing means (28) providing a timing signal (d) and establishing a timing interval;
   means (27) for sensing minimum current being supplied to the motor and deriving a minimum current signal (c);
   and the timing means (28) being connected to and controlled by the minimum current signal (c) to establish the timing interval upon sensing minimum current being supplied to the motor, the timing means being further connected to and controlling the switch control means (30) inhibiting turn-OFF of the controlled switch means by the maximum current signal until a predetermined time interval, as established by said timing means after first sensing the minimum current signal, has elapsed, to prevent spurious response of the switch control means if the maximum current sensing means provides a maximum current signal (b) in response to in-rush current, or a starting pulse at high-current level, upon first starting of the motor from stopped condition; and
   a switch control means (FIGS. 1, 2: 10–14; FIGS. 3, 4: 30) connected to and controlling said controlled switch means to turn OFF, only when sensing said high-torque conditions, the switch means supplying current to the motor.

2. System according to claim 1, wherein (FIGS. 1, 2) the current supply lines supply alternating current;
   and the starting condition sensing means comprises phase comparator means (6, 7, 8, 9) sensing the relative phase of the voltage being applied to the motor and the current taken by the motor and providing a comparative phase shift signal (e);
   and the high-torque condition sensing means comprises means (9, 10) for sensing when the phase angle between voltage and current exceeds a predetermined value, said high-torque condition sensing means being connected to and controlling the switch control means (10–14) to turn OFF said controlled switch means (15, 16).

3. System according to claim 2, wherein the starting condition sensing means and the high-torque condition sensing means include common circuit elements responding, respectively, to different phase relationships between voltage and current being supplied to the motor.

4. An electric automatic nut or screwdriver control system having
   a drive motor (M);
   electric alternating current supply lines (1, 2, 3; 20, 21, 22);
   controlled switch means (15, 16; 31) connected between the current supply lines and the motor;
   current measuring means (4; 23) serially connected with the motor in one (3, 22) of the supply lines and providing a current signal representative of current flow to the motor;
   and a control network responsive to said current signal and connected to and controlling said controlled switch means,
   comprising, in accordance with the invention,
   phase comparator means (6–9) sensing the relative phase of the voltage being supplied to the motor and the current taken by the motor and providing a comparison phase shift signal; and
   switch control means (10–14) sensing a predetermined phase shift between current and voltage and controlling the motor to turn OFF when said predetermined phase shift is exceeded, and
   wherein the phase comparator means comprises
   a threshold switch (6) receiving a voltage phasing signal (b) from one of said supply lines;
   a second threshold switch (7) receiving a voltage phasing signal from one of said supply lines; and
   a conjunctive gate (9) receiving the output signals (d, c) of said voltage and current sensing threshold switches, said conjunctive gate comparing the output signals from said threshold switches and providing a turn-OFF signal (e) when the output signal exceeds a predetermined duration.

5. System according to claim 4, further including a timing circuit (8) connected to and receiving the output signal from the voltage-responsive threshold switch and supplying a timing pulse to the conjunctive gate (9) having a predetermined time duration to establish a predetermined phase angle between voltage and current determining turn-OFF of the controlled switch means.

6. System according to claim 4, further comprising a controlled timing element (11) and a second conjunctive gate (10), said controlled timing element having its output connected to the second conjunctive gate (10) and establishing a timing interval upon receiving an output pulse from said first conjunctive gate (9).

7. System according to claim 6, wherein said conjunctive gates are AND-gates (9, 10).

8. System according to claim 6, wherein said controlled timing element (11) has a variable timing duration factor;
   a temperature sensor (12) is provided, positioned in temperature-sensing relationship with said motor and providing a motor temperature signal, said motor temperature signal being coupled to said controlled timing element to vary the timing duration thereof as a function of motor temperature.

9. An electric automatic nut or screwdriver control system having
   a drive motor (M);
   electric alternating current supply lines (1, 2, 3; 20, 21, 22);
   controlled switch means (15, 16; 31) connected between the current supply lines and the motor;
   current measuring means (4; 23) serially connected with the motor in one (3, 22) of the supply lines and providing a current signal representative of current flow to the motor;
   and a control network responsive to said current signal and connected to and controlling said controlled switch means,
   comprising, in accordance with the invention,
   phase comparator means (6–9) sensing the relative phase of the voltage being supplied to the motor and the current taken by the motor and providing a comparison phase shift signal; and
   switch control means (10–14) sensing a predetermined phase shift between current and voltage and controlling the motor to turn OFF when said predetermined phase shift is exceeded; and
   a timing holding circuit (14) connected to receive the turn-OFF signal and establishing a timing interval to maintain the turn-OFF signal for a time duration of at least one cycle of the alternating network current supply;
   a gate-controlled semiconductor switch (16), having self-holding characteristics, connected to control the motor and forming said controlled switch means (15, 16; 31), said timing holding circuit (14) insuring reliable turn-OFF of the semiconductor switch (16) and persistence of the turn-OFF signal for a time duration during which the alternating current supply will, reliably, pass through a null or zero portion of its cycle.

10. An electric automatic nut of screwdriver control system having
    a drive motor (M);
    electric alternating current supply lines (1, 2, 3; 20, 21, 22);
    controlled switch means (15, 16; 31) connected between the current supply lines and the motor;
    current measuring means (4; 23) serially connected with the motor in one (3, 22) of the supply lines and providing a current signal representative of current flow to the motor;
    and a control network responsive to said current signal and connected to and controlling said controlled switch means,
    high-current sensing means (26) providing a high-current sisgnal (b) connected to and controlling the controlled switch means (31) to turn OFF the motor when a high-current signal is sensed;
    and comprising, in accordance with the invention,
    means, for preventing spurious response of the high-current sensing means due to inrush current upon initial connection of the motor to the electric current supply lines, comprising
    timing means (28) connected to and controlled by one of said electric current supply lines and responding to minimum voltage thereon, said timing means establishing a timing interval longer than the duration of the inrush current and until the motor current has dropped to running current condition, said timing means being connected to said controlled switch means (31) to inhibit transfer of a high-current sensing signal by the high-current sensing means during said timing duration; and
    a conjunctive gate (29) connected to receive the high-current signal (b) from the high-current sensing means and the output from said timing means (28) to inhibit transfer of signals from the high-current sensing means during the timing duration of said timing means.

11. System according to claim 10, wherein the high-current sensing means comprises a first threshold switch (26) responding to the current signal (a) from the current measuring means (23); and
    a second threshold switch (27) responding to a minimum current level upon energization of the electric current supply lines, the timing means (28) being connected to the second threshold switch.

12. System according to claim 10, wherein the supply lines are alternating current supply lines;
    said current measuring means (23) comprises a measuring resistor included in one of said supply lines;
    and a rectifier is connected to rectify the alternating current signal and transmit said so-rectified signal to both of said threshold switches (26, 27).

13. System according to claim 10, further including a memory circuit (30) storing a turn-OFF signal interposed between the conjunctive gate (29) and said controlled switch means (31);
    and connection means for resetting the memory circuit and erasing memory data contained therein upon each response of the threshold switch (27) connected to sense a minimum current flow to the motor upon connection of said supply lines.

* * * * *

UNITED STATES PATENT AND TRADEMARK OFFICE
CERTIFICATE OF CORRECTION

PATENT NO. : 4,562,389
DATED : December 31, 1985
INVENTOR(S) : Wolfgang JUNDT et al It is certified that error appears in the above-identified patent and that said Letters Patent is hereby corrected as shown below:

Column 5, line 18, change "1/120 seconds" to -- 1/120 second --

5, line 39, delete "as redundant"

5, line 43, change "of the timing circuit 11" to

-- at the timing input 11 --

Signed and Sealed this

Twentieth Day of May 1986

[SEAL]

Attest:

DONALD J. QUIGG

Attesting Officer

Commissioner of Patents and Trademarks